United States Patent
Jaiswal et al.

(10) Patent No.: US 8,300,630 B2
(45) Date of Patent: Oct. 30, 2012

(54) UPD-BASED SOFT PHONE STATE MONITORING FOR CTI APPLICATIONS

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1265 days.

(21) Appl. No.: 12/049,119

(22) Filed: Mar. 14, 2008

(65) Prior Publication Data

US 2009/0232127 A1 Sep. 17, 2009

(51) Int. Cl.
*H04L 12/66* (2006.01)
(52) U.S. Cl. ........................................ 370/352; 370/252
(58) Field of Classification Search ............. 379/221.15, 379/207.02, 265.06, 201.07, 264.04, 210.02, 379/428.03; 709/202, 231, 224, 206, 218; 725/87, 86; 370/356, 313, 351, 352; 726/13; 705/10; 250/221; 455/404.1, 425
See application file for complete search history.

(56) References Cited

U.S. PATENT DOCUMENTS

| | | | |
|---|---|---|---|
| 6,173,260 B1 | 1/2001 | Slaney | |
| 7,596,373 B2 * | 9/2009 | McGregor et al. | 455/425 |
| 7,936,694 B2 * | 5/2011 | Choudhury | 370/252 |
| 2002/0009188 A1 * | 1/2002 | Rosset et al. | 379/221.15 |
| 2003/0217098 A1 * | 11/2003 | Bobde et al. | 709/202 |
| 2003/0229900 A1 * | 12/2003 | Reisman | 725/87 |
| 2004/0022237 A1 * | 2/2004 | Elliott et al. | 370/356 |
| 2004/0071281 A1 * | 4/2004 | Rashid | 379/210.02 |
| 2004/0148387 A1 * | 7/2004 | Sethi | 709/224 |
| 2005/0123117 A1 * | 6/2005 | Stockdale | 379/207.02 |
| 2005/0128969 A1 * | 6/2005 | Lee et al. | 370/313 |
| 2005/0286705 A1 | 12/2005 | Contolini et al. | |
| 2006/0037071 A1 * | 2/2006 | Rao et al. | 726/13 |
| 2006/0133349 A1 * | 6/2006 | Kan et al. | 370/352 |
| 2006/0165066 A1 * | 7/2006 | Campbell et al. | 370/352 |
| 2006/0188085 A1 * | 8/2006 | Ricketts | 379/265.06 |
| 2006/0210041 A1 * | 9/2006 | Citron et al. | 379/201.07 |
| 2006/0221941 A1 * | 10/2006 | Kishinsky et al. | 370/352 |
| 2007/0064672 A1 * | 3/2007 | Raghav et al. | 370/351 |
| 2007/0209052 A1 * | 9/2007 | Taylor et al. | 725/86 |
| 2007/0233549 A1 * | 10/2007 | Watson et al. | 705/10 |
| 2007/0246642 A1 * | 10/2007 | Millett et al. | 250/221 |
| 2008/0037761 A1 * | 2/2008 | Cordell et al. | 379/265.04 |
| 2008/0123840 A1 * | 5/2008 | Rao | 379/428.03 |
| 2008/0208605 A1 * | 8/2008 | Sinha et al. | 705/1 |
| 2009/0077184 A1 * | 3/2009 | Brewer et al. | 709/206 |
| 2009/0157891 A1 * | 6/2009 | Hughes | 709/231 |
| 2009/0209224 A1 * | 8/2009 | Borislow et al. | 455/404.1 |
| 2009/0316687 A1 * | 12/2009 | Kruppa | 370/352 |
| 2010/0217837 A1 * | 8/2010 | Ansari et al. | 709/218 |
| 2010/0290453 A1 * | 11/2010 | Rist et al. | 370/352 |

FOREIGN PATENT DOCUMENTS

| | | | |
|---|---|---|---|
| JP | 2003298748 A | * | 10/2003 |
| KR | 2002001175 A | * | 1/2002 |
| WO | 2006101952 A2 | | 9/2006 |

* cited by examiner

*Primary Examiner* — Asad M Nawaz
*Assistant Examiner* — Parth Patel
(74) *Attorney, Agent, or Firm* — Yudell Isidore Ng Russell PLLC

(57) ABSTRACT

A supervisor computer directly communicates, via User Datagram Protocol (UDP) packets, with a call control application software in a soft phone. The UDP packets provide real-time information, from a desktop of the soft phone, describing call activity and usage status of the soft phone. The supervisor computer is able to remotely control usage of the soft phone according to information provided by the UDP packets.

10 Claims, 6 Drawing Sheets

UPD-BASED SOFT PHONE STATE MONITORING FOR CTI APPLICATIONS

BACKGROUND OF THE INVENTION

1. Technical Field

The present disclosure relates in general to the field of telecommunications, and more particularly to soft phones. Still more particularly, the present disclosure relates to monitoring soft phone states.

2. Description of the Related Art

Call centers are effective units for receiving and directing calls from customers. The calls may be for requests for a service, a new product, product support, etc. Oftentimes, agents in the call centers will use a Computer Telephony Integration (CTI) phone system, also called a soft phone. A CTI phone system integrates a voice phone with a computer. For example, when an agent receives a phone call, information such as the caller's identification can be displayed on a desktop display used by the computer.

Present methods for monitoring the desktop display include taking a "screen shot" of the desktop display (e.g., creating a Joint Photographic Experts Group (JPEG) file that represents the desktop display). Such methods are 1) resource heavy (since they have to capture the entire desktop display), 2) are not interactive, and 3) are not in true real-time. Thus, such monitoring is not useful when attempting to monitor real-time activity of CTI phone systems.

SUMMARY OF THE INVENTION

A supervisor computer directly communicates, via User Datagram Protocol (UDP) packets, with a call control application software in a soft phone. The UDP packets provide real-time information, from a desktop of the soft phone, describing call activity and usage status of the soft phone. The supervisor computer is able to remotely control usage of the soft phone according to information provided by the UDP packets.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
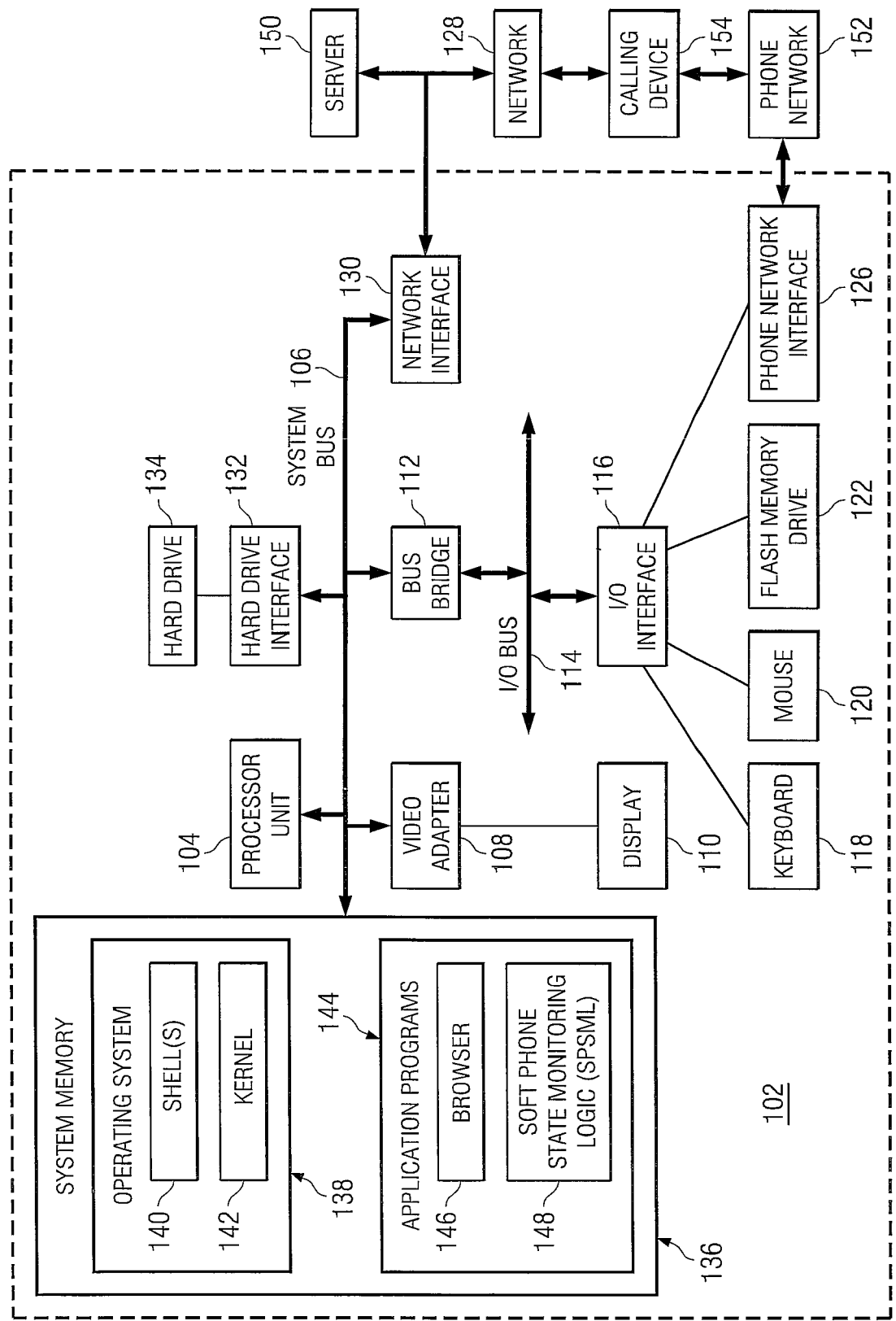
FIG. 1 illustrates an exemplary computer/phone system in which the present invention may be utilized.

With reference now to FIG. 1, there is depicted a block diagram of an exemplary computer 102, which the present invention may utilize. Note that some or all of the exemplary architecture shown for computer 102 may also be utilized by software deploying server 150 and a supervisor computer 214 (shown in FIG. 2), and that by utilizing appropriate elements of computer 102 (e.g., phone network interface 126), some or all of the architecture shown as computer 102 may be utilized by a calling device 154 (e.g., a land-line telephone, a cellular phone, a "smart" phone, etc.) as well as CTI phone systems 204a-n (shown in FIG. 2).

Computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a flash memory drive 122, a floppy disk drive 124, and a phone network interface 126. The phone network interface 126 includes any hardware and/or software needed to communicate with a phone network 152, and includes, but is not limited to, a microphone, a speaker, a modulator/demodulator (modem), and other logic needed to provide the functionality of a telephone. Phone network 152 may include a telephony server (not shown), which enables call switching through a phone network (e.g., Plain Old Telephone Service (POTS) systems, cellular systems, Voice Over Internet Protocol (VOIP) systems, etc.) Keyboard 118, in cases where some or all of the architecture of computer 102 is used as a telephone, may be a miniaturized keyboard or an alpha-numeric keypad used by a standard telephone (either land-line, cellular or satellite). The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102. Note also that if calling device 154 is a computer based calling device (e.g., using Voice Over Internet Protocol—VoIP or a similar packet based telephonic system), computer 102 may also communicate with the calling device 154 via the network 128.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using Hyper-Text Transfer Protocol (HTTP) messaging, thus enabling communication with software deploying server 150.

Application programs 144 in computer 102's system memory (as well as software deploying server 150's system memory) also include a Soft Phone State Monitoring Logic (SPSML) 148. SPSML 148 includes code for implementing the processes described in FIGS. 2-5B. In one embodiment, computer 102 is able to download SPSML 148 from software deploying server 150, including in an "on demand" basis, as described in greater detail below in FIGS. 4A-5B. Note that, in a preferred embodiment of the present invention, software deploying server 150 performs all of the functions associated with the present invention (including execution of SPSML 148), thus freeing computer 102 from having to use its own internal computing resources to execute SPSML 148.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
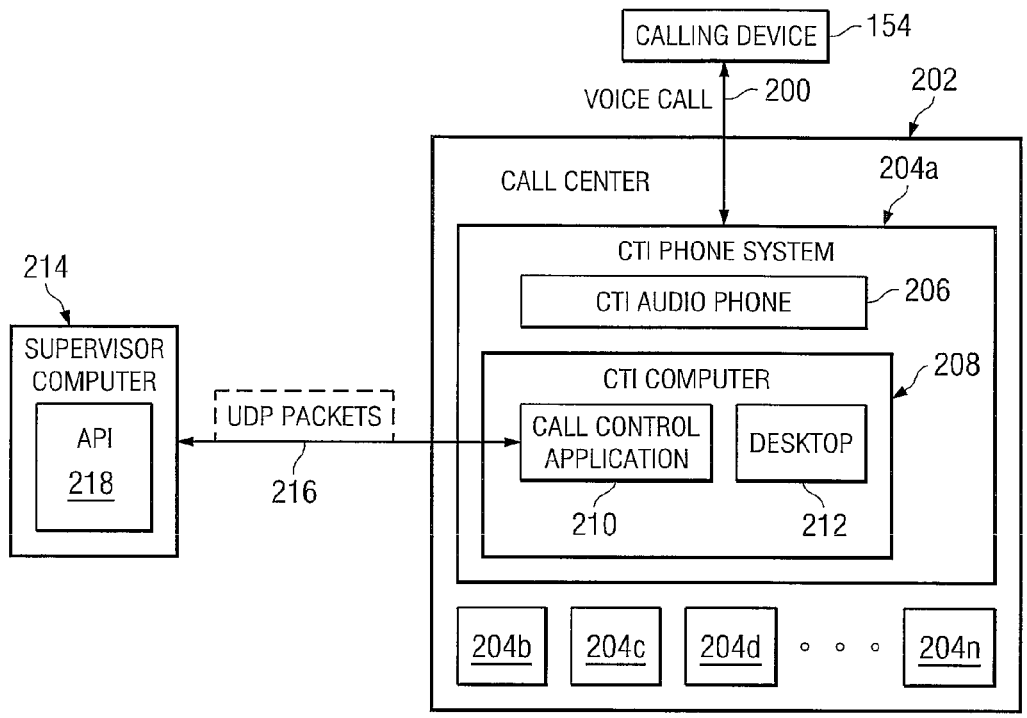
FIG. 2 depicts an exemplary organization of a call center that utilizes multiple soft phones, which are monitored and controlled by a supervisor.

With reference now to FIG. 2, an overview of a voice call 200 being directed from a calling device 154 to an appropriate call recipient (e.g., an agent using one of the Computer Telephony Integrated phone systems ("soft phones") 204a-n, where "n" is an integer) in a call center 202 is presented.

For exemplary purposes, assume that the voice call 200 has been sent to CTI phone system 204a. CTI phone system 204a includes two main components: a CTI audio phone 206 (which communicates via the phone network 152 shown in FIG. 1), and a CTI computer 208 (which communicates via the network 128 shown in FIG. 1). That is, the CTI phone system 204a, which may be implemented by the architecture of computer 102 shown in FIG. 1, is both a voice phone (CTI audio phone 206) and a data terminal (CTI computer 208), which are integrated together to become a soft phone (CTI phone system 204a).

The CTI computer 208 includes a Call Control Application 210, which is software that is utilized to 1) control functionality of a CTI call, and 2) manage Graphical User Interface (GUI) state of a desktop 212. The desktop 212 (e.g., using a display 110 shown in FIG. 1) displays state data about the voice call 200. This state data is collectively referred to as the desktop state information, and includes information such as information about the caller, information about the calling device 154, how the voice call 200 was routed to the CTI phone system 204a, time and date stamps (including length) of the voice call 200, etc. The call control application 210 collects and stores this information, both for local display on the desktop 212, and for transmission to a supervisor computer 214.

The desktop state information is transmitted (e.g., via a network interface 130 shown in FIG. 1) to the supervisor computer 214 via User Datagram Protocol (UDP packets 216 that are consumed by an Application Programming Interface (API) 218 in the supervisor computer 214. UDP packets 216 are stateless, meaning that they do not require a communication session that checks packet status. Rather, the UDP packets 216 are simply sent back and forth between the supervisor computer 214 and the call control application 210, without regard to whether they arrive intact, or even whether they arrive at all. This has the disadvantage of not being as reliable as, for example, a Transmission Control Protocol—TCP session, but has the advantage of having much less overhead than TCP. Thus, the use of UDP packets 216 is not merely an arbitrary choice, but is essential for providing a low-cost low-overhead and fast method to communicate the soft phone state (e.g., information about the voice call 200 that is also being displayed on the desktop 212), which would not be technically efficient if TCP packets were used. Furthermore, the UDP packets are extensible, using Extensible Markup Language (XML) tags, and thus allowing different control/monitor features to be enabled to the supervisor computer 218. For example, consider the following pseudocode:

```
MESSAGE AGENT TO AUDIT SERVER
<Version Information START>
<Agent Credentials>...</Agent Credentials> /* Login ID, Password,
Queue, Skills */
<Button Clicked Timestamp>
    <READY> Timestamp </READY>
    <NOT READY> Timestamp </NOT READY>
    <Call Answer> Timestamp </Call Answer>
    /* Any other buttons */
</Button Clicked Timestamp >
<User Data> </User Data> /*Empty buffer*/
<Version Information START>
MESSAGE AUDIT SERVER TO AGENT
<Version Information START>
<Agent Credentials>...</Agent Credentials> /* Login ID, Password,
Queue, Skills */
<Button Click >
    <READY> YES </READY>
    <NOT READY> YES </NOT READY>
    <Call Answer> YES </Call Answer>
    /* Any other buttons */
</Button Click>
<User Data> </User Data> /*Empty buffer*/
<APPLICATION CONTROL>
    <TERMINATE> TRUE </TERMINATE>   /* Flag to notify that the
                                       application will be terminated */
</APPLICATION CONTROL>
:
:
<Version Information START>
```

As represented, only a simple amount of UDP-based XML-extendable code is necessary to initiate a control of the CTI phone system 204a ("MESSAGE AGENT TO AUDIT SERVER"), and for the supervisor computer 214 to take over such control ("MESSAGE AUDIT SERVER TO AGENT").

Figure 3:
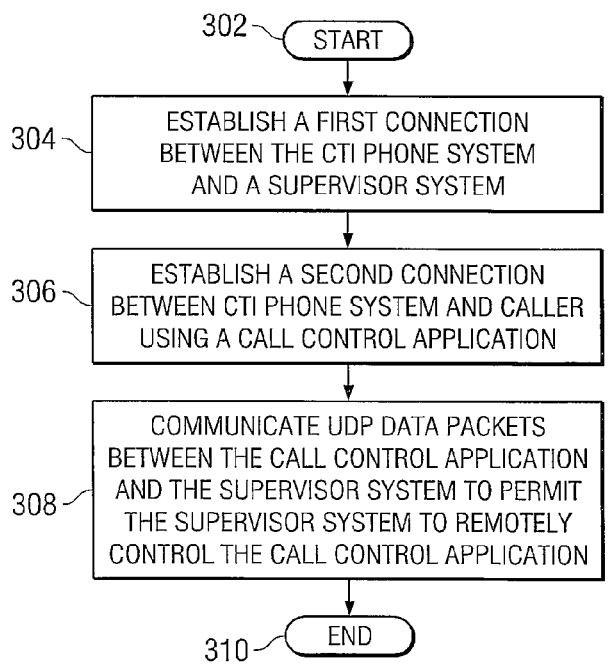
FIG. 3 is a high-level flow-chart describing how to remotely monitor and control soft phones.

Referring now to FIG. 3, a high-level flow-chart of exemplary steps taken to monitor and control a soft phone is presented. After initiator block 302, a first connection is established between a CTI phone system ("soft phone") and a supervisor system (e.g., supervisor computer 214), as described in block 304. A second connection may also be established between the CTI phone system and a caller (block 306). Both connections utilize the call control application software in the CTI phone system. That is, the call control application not only is used to establish the voice connection between the caller and the soft phone, but the call control application also populates the soft phone's desktop with information about the voice call (e.g., length of time of the call, time and date, etc.), including information (e.g., using a lookup table that matches personal and/or marketing information about the caller based on the caller's phone number, etc.) about the caller making the voice call as well as equipment used by the caller (e.g., phone number identification, etc.).

As depicted in block 308, UDP data packets (preferably XML-extended) are then communicated back and forth between the call control application and the supervisor system. This information permits the supervisor computer to control the soft phone without being restricted to a particular type of soft phone or software, since such communication is performed by an specially-coded API at the supervisor computer. That is, the API at the supervisor computer provides an interface that does not care what software is running on the soft phone.

Similarly, the information in the UDP packets allows a supervisor, using the supervisor computer, to monitor multiple soft phones, and more particularly their desktops, on a dashboard (which displays multiple desktops of different soft phones in real time, using information from the UDP packets). When the supervisor notices an anomaly on one of the desktops (e.g., that an agent is taking too long on a call, indicating that the call is not being productive), then the supervisor can transmit a message to the agent (e.g., via an Instant Message, e-mail, etc.) that offers suggestions on how to 1) make the call more productive (e.g., move the conversation to another product) or 2) simply terminate the call in order to move on to the next caller.

Furthermore, the information in the UDP packets can be used by the supervisor to observe that the desktop itself has frozen (is not being refreshed with new data about the phone call). For example, assume that the supervisor notices that the "time of day" display is not changing on the desktop, which is being replicated at the supervisor's computer by information from the UDP packets. The supervisor can then send a UDP packet back to the call control application software in the CTI phone system (soft phone), directing the desktop to restart (in order to "unfreeze" the desktop).

Similarly, the information in the UDP packets can be used by the supervisor to determine if the agent using the soft phone has incorrectly stated a ready status. For example, assume that the agent (using code similar to the pseudocode shown above) has indicated to the call center, and the supervisor, that her soft phone is ready to receive calls. However, a monitoring of the desktop (on the dashboard being watched by the supervisor) reveals that this soft phone has failed to answer several phone calls directed to it during the past thirty minutes. A conclusion can be reached that the agent is in fact not available, and thus the soft phone is not ready to receive calls. The supervisor can therefore remotely take that soft phone off line by setting it to be "not ready."

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of SPSML 148, are performed by service provider server 150. Alternatively, SPSML 148 and the method described herein, and in particular as shown and described in FIGS. 2-3, can be deployed as a process software from service provider server 150 to computer 102. Still more particularly, process software for the method so described may be deployed to service provider server 150 by another service provider server (not shown).

Figure 4A:
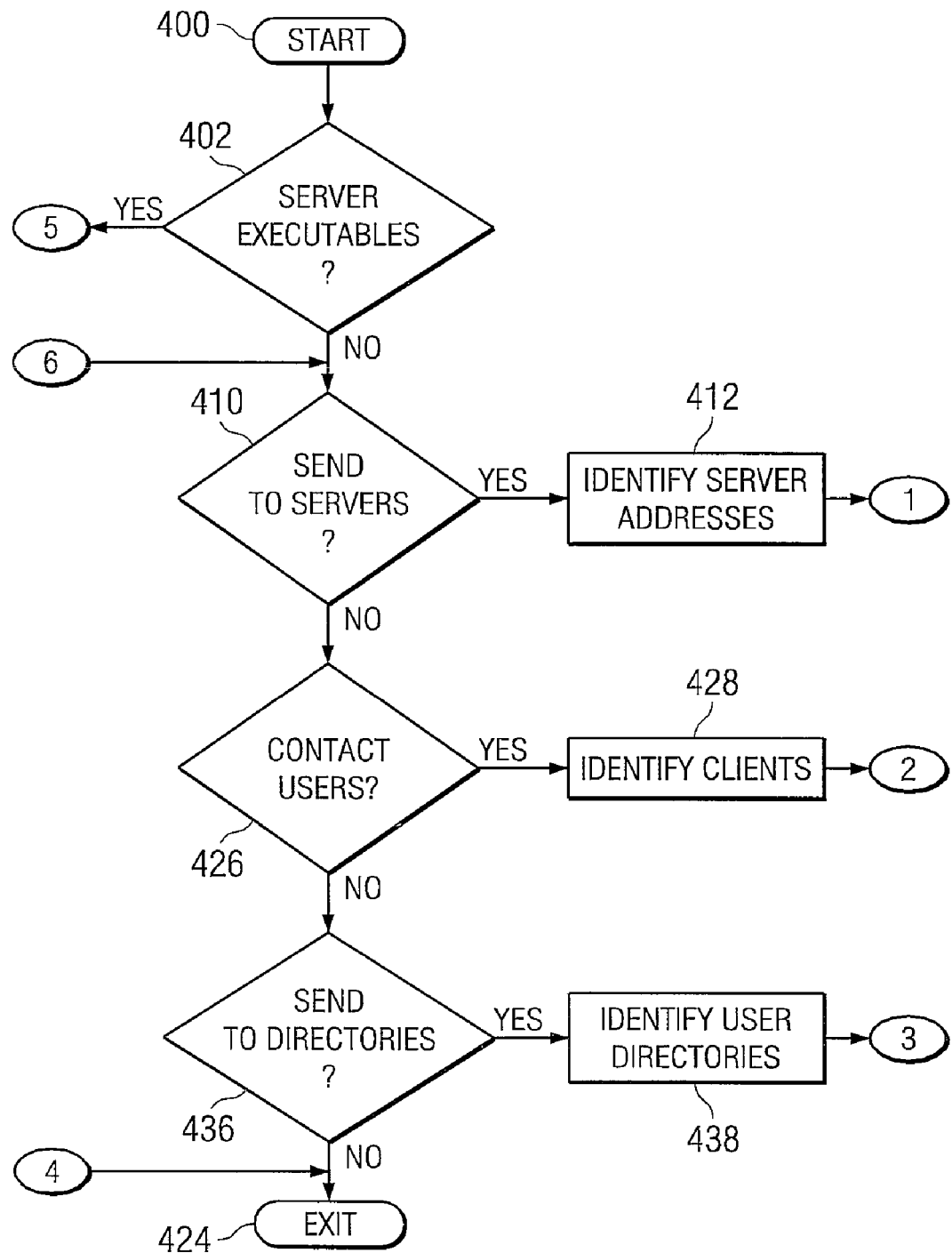
FIGS. 4A-B are flow-charts showing steps taken to deploy software capable of executing the steps and processes described in FIGS. 2-3.
Figure 4B:
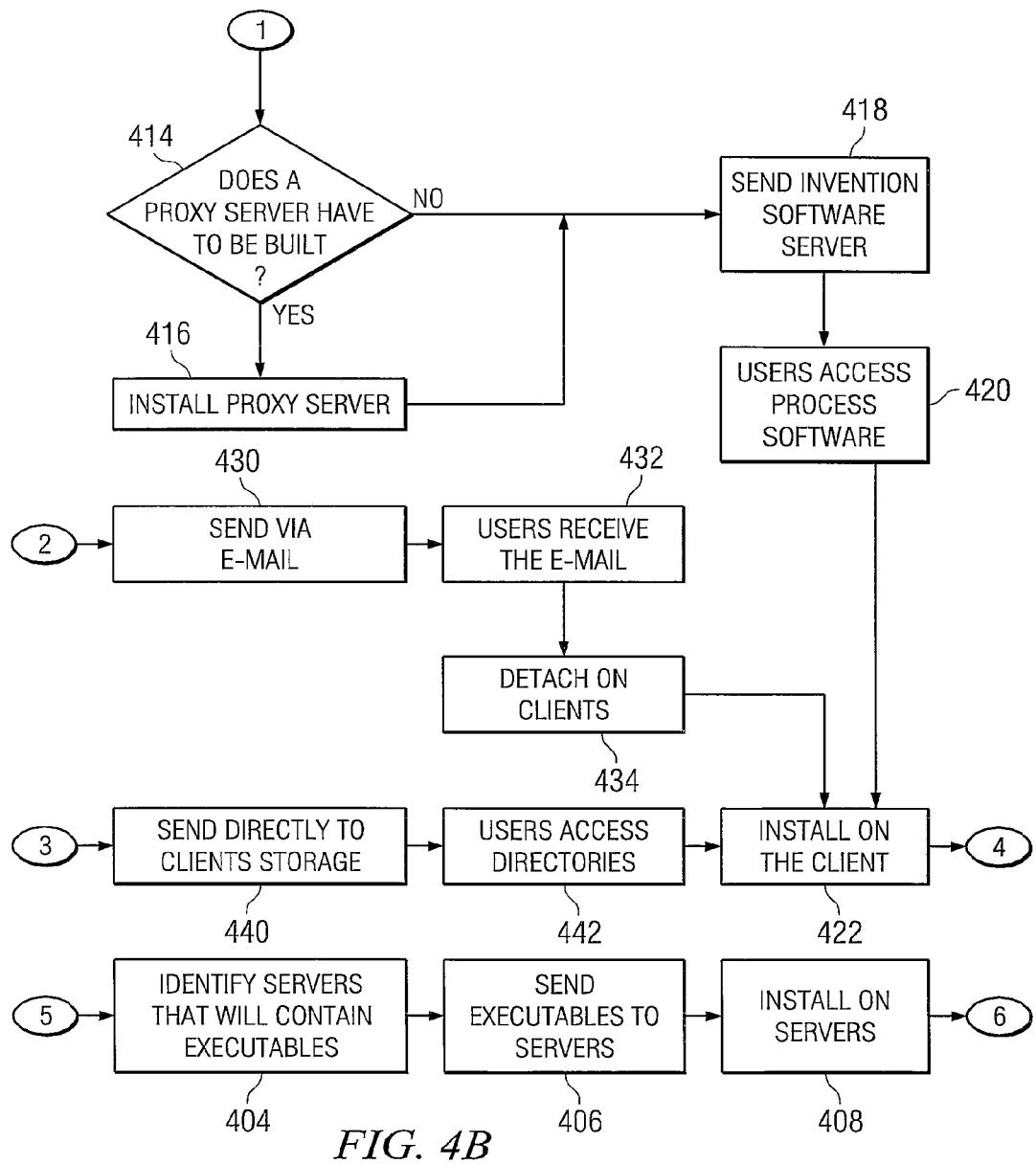

Referring then to FIGS. 4A-B, step 400 begins the deployment of the process software. The first thing is to determine if there are any programs that will reside on a server or servers when the process software is executed (query block 402). If this is the case, then the servers that will contain the executables are identified (block 404). The process software for the server or servers is transferred directly to the servers' storage via File Transfer Protocol (FTP) or some other protocol or by copying though the use of a shared file system (block 406). The process software is then installed on the servers (block 408).

Next, a determination is made on whether the process software is to be deployed by having users access the process software on a server or servers (query block 410). If the users are to access the process software on servers, then the server addresses that will store the process software are identified (block 412).

A determination is made if a proxy server is to be built (query block 414) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 416). The process software is sent to the servers either via a protocol such as FTP or it is copied directly from the source files to the server files via file sharing (block 418). Another embodiment would be to send a transaction to the servers that contained the process software and have the server-process the transaction, then receive and copy the process software to the server's file system. Once the process software is stored at the servers, the users, via their client computers, then access the process software on the servers and copy to their client computers file systems (block 420). Another embodiment is to have the servers automatically copy the process software to each client and then run the installation program for the process software at each client computer. The user executes the program that installs the process software on his client computer (block 422) then exits the process (terminator block 424).

In query step 426, a determination is made whether the process software is to be deployed by sending the process software to users via e-mail. The set of users where the process software will be deployed are identified together with the addresses of the user client computers (block 428). The process software is sent via e-mail to each of the users' client computers (block 430). The users then receive the e-mail (block 432) and then detach the process software from the e-mail to a directory on their client computers (block 434). The user executes the program that installs the process software on his client computer (block 422) then exits the process (terminator block 424).

Lastly a determination is made as to whether the process software will be sent directly to user directories on their client computers (query block 436). If so, the user directories are identified (block 438). The process software is transferred directly to the user's client computer directory (block 440). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 442). The user executes the program that installs the process software on his client computer (block 422) and then exits the process (terminator block 424).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 5A:
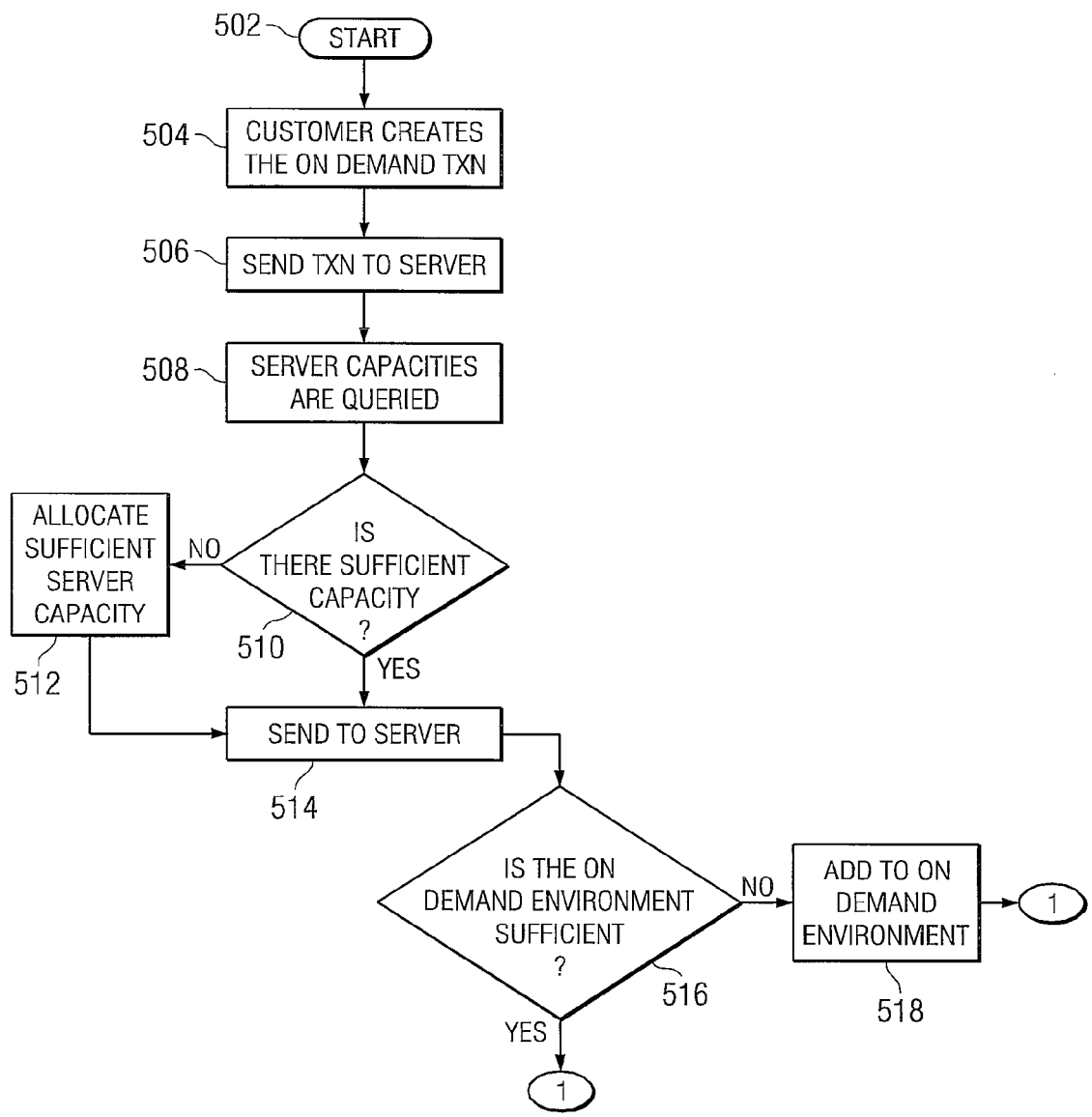
FIGS. 5A-B are flow-charts showing steps taken to execute the steps and processes shown in FIGS. 2-3 using an on-demand service provider.
Figure 5B:
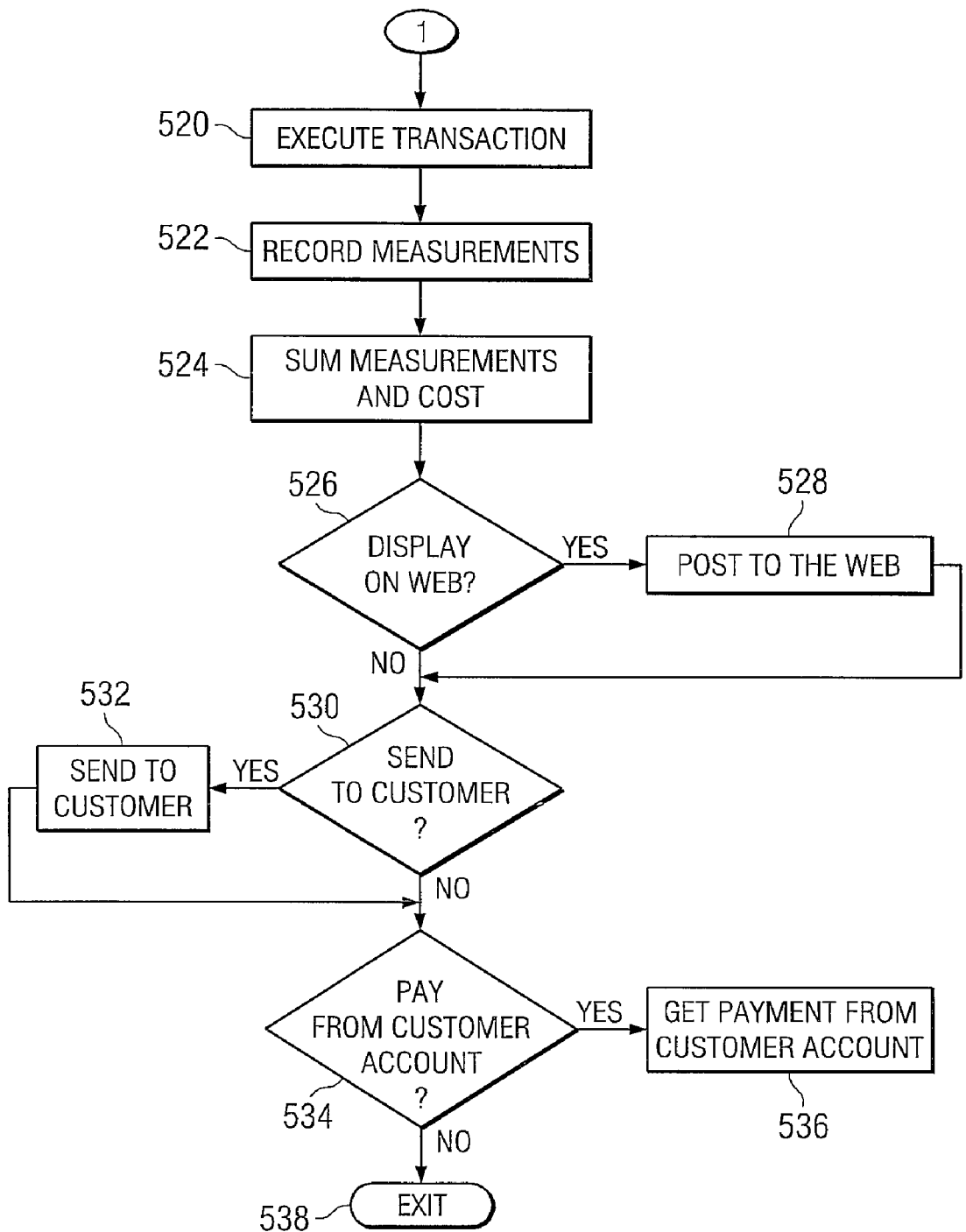

With reference now to FIGS. 5A-B, initiator block 502 begins the On Demand process. A transaction is created than contains the unique customer identification, the requested service type and any service parameters that further, specify the type of service (block 504). The transaction is then sent to the main server (block 506). In an On Demand environment the main server can initially be the only server, then as capacity is consumed other servers are added to the On Demand environment.

The server central processing unit (CPU) capacities in the On Demand environment are queried (block 508). The CPU requirement of the transaction is estimated, then the server's available CPU capacity in the On Demand environment are compared to the transaction CPU requirement to see if there is sufficient CPU available capacity in any server to process the transaction (query block 510). If there is not sufficient server CPU available capacity, then additional server CPU capacity is allocated to process the transaction (block 512). If there was already sufficient available CPU capacity then the transaction is sent to a selected server (block 514).

Before executing the transaction, a check is made of the remaining On Demand environment to determine if the environment has sufficient available capacity for processing the transaction. This environment capacity consists of such things as but not limited to network bandwidth, processor memory, storage etc. (block 516). If there is not sufficient available capacity, then capacity will be added to the On Demand environment (block 518). Next the required software to process the transaction is accessed, loaded into memory, then the transaction is executed (block 520).

The usage measurements are recorded (block 522). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 524).

If the customer has requested that the On Demand costs be posted to a web site (query block 526), then they are posted (block 528). If the customer has requested that the On Demand costs be sent via e-mail to a customer address (query block 530), then these costs are sent to the customer (block 532). If the customer has requested that the On Demand costs be paid directly from a customer account (query block 534), then payment is received directly from the customer account (block 536). The On Demand process is then exited at terminator block 538.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method of monitoring a state of a Computer Telephony Integration (CTI) phone system, in a call center comprising a plurality of CTI phone systems, wherein the CTI phone system comprises an audio telephone for transceiving voice telephone calls, and wherein the CTI phone system further comprises a CTI computer system that comprises a desktop, wherein the desktop displays call information for a call that is received by the audio telephone during a telephone connection, and wherein the call information is processed by a call control application software in the CTI computer, the method comprising, during the telephone connection:

dynamically receiving, by a remote supervisor computer, a plurality of inbound XML-extended User Datagram Protocol (UDP) packets comprising data indicating the call information for the call that is received by the audio telephone, wherein the remote supervisor computer displays multiple desktops each corresponding to one of the plurality of CTI phone systems;

remotely monitoring the call information by the remote supervisor computer and a human supervisor using the remote supervisor computer, wherein the remote supervisor computer directly accesses and monitors the call control application software by the plurality of inbound XML-extended UDP packets, wherein each of the multiple desktops represents different desktop information, from different instances of the call control application software, for a different CTI phone system from the plurality of CTI phone systems in the call center, wherein the multiple desktops displayed on the supervisor computer are generated using UDP packets from each CTI phone system, wherein the UDP packets describe call information for calls received by different CTI phone systems;

registering, by the remote supervisor computer, an anomaly in the call information;

in response to registering the anomaly in the call information, remotely controlling, by the remote supervisor computer, a handling of the call according to the call information supplied by the call control application software, wherein remotely controlling comprises:

identifying a solution to the anomaly, encoding the identified solution in a plurality of outbound XML-extended UDP packets, and transmitting the outbound XML-extended UDP packets to the CTI phone system; and in response to registering that the human supervisor observes an unproductive call by an agent using the CTI phone system, transmitting a message to the agent, wherein the message comprises instructions for increasing a call productivity.

2. The method of claim 1, wherein the desktop further comprises information indicating that the CTI phone system is in a "ready" mode to accept the call, the method further comprising:

in response to determining that a user of the CTI phone system has not answered multiple calls over a pre-determined period of time, remotely resetting, by the remote supervisor computer, the CTI phone system to a "not ready" mode.

3. The method of claim 1, further comprising:

in response to registering that the human supervisor observes, on one of the multiple desktops, that a desktop from the multiple desktops has frozen up on the corresponding CTI phone, transmitting a reset signal from the supervisor computer to the CTI phone having the frozen desktop, wherein the reset signal unfreezes the frozen desktop.

4. A Computer Telephony Integration (CTI) phone system in a call center comprising a plurality of CTI phone systems, the system comprising:

an audio telephone for transceiving voice telephone calls;

a CTI computer system;

a Call Control Application software in the CTI computer system;

a desktop that is supported by the call control application software, wherein the desktop displays call information for a call that is received by the audio telephone during a telephone connection, and wherein the call information is processed by the call control application software in the CTI computer; and a transmitter for transmitting the call information in the call control application software to a remote supervisor computer, wherein the remote supervisor computer, during the telephone connection:

dynamically receives a plurality of inbound XML-extended User Datagram Protocol (UDP) packets comprising data indicating the call information for the call that is received by the audio telephone, wherein the remote supervisor computer displays multiple desktops each corresponding to one of the plurality of CTI phone systems;

monitor the call information by remote supervisor computer and a human supervisor using the remote supervisor computer, using the plurality of inbound XML-extended UDP packets, wherein each of the multiple desktops represents different desktop information, from different instances of the call control application software, for a different CTI phone system from the plurality of CTI phone systems in the call center, wherein the multiple desktops displayed on the supervisor computer are generated using UDP packets from each CTI phone system, wherein the UDP packets describe call information for calls received by different CTI phone systems;

register an anomaly in the call information;

in response to registering the anomaly in the call information, remotely control the call by the CIT phone system according to the call information for the call, wherein remotely controlling comprises:

identifying a solution to the anomaly, encoding the identified solution in a plurality of outbound XML-extended UDP packets, and transmitting the outbound XML-extended UDP packets to the CTI phone system; and in response to registering that the human supervisor observes an unproductive call by an agent using the CTI phone system, transmit a message to the agent, wherein the message comprises instructions for increasing a call productivity.

5. The CTI phone system of claim 4, wherein the desktop further comprises information indicating that the CTI phone system is in a ready mode to accept the call, and wherein the transmitter is further enabled to transmit an inactivity message to the supervisor computer, wherein the inactivity message indicates that a user of the CTI phone system has not answered multiple calls over a pre-determined period of time.

6. A computer-readable tangible storage device on which is stored a computer program, the computer program comprising computer executable instructions configured execution by a processor to:

monitor a state of a Computer Telephony Integration (CTI) phone system in a call center comprising a plurality of CTI phone systems, wherein the CTI phone system comprises an audio telephone for transceiving voice telephone calls, and wherein the CTI phone system further comprises a CTI computer system that comprises a desktop, wherein the desktop displays call information for a call that is received by the audio telephone during a telephone connection, and wherein the call information is processed by a call control application software in the CTI computer, wherein monitoring comprises;

dynamically receiving a plurality of inbound XML-extended User Datagram Protocol (UDP) packets comprising data indicating the call information for the call that is received by the audio telephone, wherein the remote supervisor computer displays multiple desktops each corresponding to one of the plurality of CTI phone systems;

remotely monitoring the call information by the remote supervisor computer and a human supervisor using the remote supervisor computer, wherein the remote supervisor computer directly accesses and monitors the call control application software by the plurality of inbound XML-extended UDP packets, wherein each of the multiple desktops represents different desktop information, from different instances of the call control application software, for a different CTI phone system from the plurality of CTI phone systems in the call center, wherein the multiple desktops displayed on the supervisor computer are generated using UDP packets from each CTI phone system, wherein the UDP packets describe call information for calls received by different CTI phone systems;

registering, by the remote supervisor computer, an anomaly in the call information;

in response to registering the anomaly in the call information, remotely controlling, by the remote supervisor computer, a handling of the call according to the call information for the call, wherein remotely controlling comprises:

identifying a solution to the anomaly, encoding the identified solution in a plurality of outbound XML-extended UDP packets, and transmitting the outbound XML-extended UDP packets to the CTI phone system; and in response to registering that the human supervisor observes an unproductive call by an agent using the CTI phone system, transmitting a message to the agent, wherein the message comprises instructions for increasing a call productivity.

7. The computer-readable tangible storage device of claim 6, wherein the desktop further comprises information indicating that the CTI phone system is in a ready mode to accept the call, and wherein the executable instructions are further configured for:

in response to determining that a user of the CTI phone system has not answered multiple calls over a pre-determined period of time, resetting the CTI phone system to a not ready mode.

8. The computer-readable tangible storage device of claim 6, wherein the executable instructions are further configured for:

in response to registering that the human supervisor observes, on one of the multiple desktops, that a desktop from the multiple desktops has frozen up on the corresponding CTI phone, transmitting a reset signal from the supervisor computer to the CTI phone having the frozen desktop, wherein the reset signal unfreezes the frozen desktop.

9. The computer-readable tangible storage device of claim 6, wherein the computer-readable tangible storage device is a component of a remote server, and wherein the computer executable instructions are deployable to the supervisory computer from the remote server.

10. The computer-readable tangible storage device of claim 6, wherein the computer executable instructions are capable of being provided by a service provider to a customer on an on demand basis.

* * * * *